(12) United States Patent
Yokoyama et al.

(10) Patent No.: US 10,969,355 B2
(45) Date of Patent: *Apr. 6, 2021

(54) MEASURING DEVICE FOR COEFFICIENT OF THERMAL EXPANSION AND MEASUREMENT METHOD FOR COEFFICIENT OF THERMAL EXPANSION

(71) Applicant: MITUTOYO CORPORATION, Kawasaki (JP)

(72) Inventors: Yuichiro Yokoyama, Abiko (JP); Takeshi Hagino, Tsukuba (JP)

(73) Assignee: MITUTOYO CORPORATION, Kawasaki (JP)

( * ) Notice: Subject to any disclaimer, the term of this patent is extended or adjusted under 35 U.S.C. 154(b) by 244 days.

This patent is subject to a terminal disclaimer.

(21) Appl. No.: 16/040,779

(22) Filed: Jul. 20, 2018

(65) Prior Publication Data

US 2019/0064089 A1     Feb. 28, 2019

(30) Foreign Application Priority Data

Aug. 31, 2017  (JP) .............................. JP2017-167666

(51) Int. Cl.
*G01N 25/16*  (2006.01)
*G01B 11/16*  (2006.01)
*G01B 21/00*  (2006.01)

(52) U.S. Cl.
CPC .......... *G01N 25/16* (2013.01); *G01B 11/161* (2013.01); *G01B 21/00* (2013.01)

(58) Field of Classification Search
CPC ..................................................... G01N 25/16
See application file for complete search history.

(56) References Cited

FOREIGN PATENT DOCUMENTS

JP          3897655 B2     3/2007

*Primary Examiner* — Lisa M Caputo
*Assistant Examiner* — Nasir U. Ahmed
(74) *Attorney, Agent, or Firm* — Oliff PLC

(57) ABSTRACT

A coefficient-of-thermal-expansion measuring device includes: a temperature detector detecting an object's temperature; an optical interferometer measuring an object's length using single-wavelength light; an actual data acquiring unit changing the object's temperature to temperatures and acquiring actual data of the length measured by the optical interferometer at each temperature; a data set generating unit generating pieces of verification data for each actual data by setting an order of interference within a predetermined range, selecting one piece of verification data at each temperature, and generating data sets each containing the selected piece of verification data, the data sets having different combinations of selection of the pieces of verification data; and a judging unit calculating a linear approximation function for each data set, and judging, using an evaluation index value based on differences of the verification data in each data set from the linear approximation function, applicability of each data set.

9 Claims, 16 Drawing Sheets

FIG. 4

| DATA SET NO. | TEMPERATURE | $20-\Delta t$ | $20-\Delta t \times 2/3$ | $20-\Delta t \times 1/3$ | 20 | $20+\Delta t \times 1/3$ | $20+\Delta t \times 2/3$ | $20+\Delta t$ |
|---|---|---|---|---|---|---|---|---|
| 1 | LENGTH | L1−3(λ/2) | L2−3(λ/2) | L3−3(λ/2) | L4−3(λ/2) | L5−3(λ/2) | L6−3(λ/2) | L7−3(λ/2) |
| 2 | | L1−3(λ/2) | L2−3(λ/2) | L3−3(λ/2) | L4−3(λ/2) | L5−3(λ/2) | L6−3(λ/2) | L7−2(λ/2) |
| · | | · | · | · | · | · | · | · |
| · | | · | · | · | · | · | · | · |
| 411764 | | L1−(λ/2) | L2−(λ/2) | L3 | L4 | L5 | L6 | L7 |
| 411765 | | L1 | L2 | L3 | L4 | L5 | L6 | L7−(λ/2) |
| 411766 | | L1 | L2 | L3 | L4 | L5 | L6−(λ/2) | L7 |
| 411767 | | L1 | L2 | L3 | L4 | L5−(λ/2) | L6 | L7 |
| 411768 | | L1 | L2 | L3 | L4−(λ/2) | L5 | L6 | L7 |
| 411769 | | L1 | L2−(λ/2) | L3−(λ/2) | L4 | L5 | L6 | L7 |
| 411770 | | L1 | L2 | L3 | L4 | L5 | L6 | L7 |
| 411771 | | L1−(λ/2) | L2 | L3 | L4 | L5 | L6 | L7 |
| 411772 | | L1+(λ/2) | L2 | L3 | L4 | L5 | L6 | L7 |
| 411773 | | L1 | L2 | L3 | L4 | L5 | L6 | L7 |
| 411774 | | L1 | L2+(λ/2) | L3+(λ/2) | L4 | L5 | L6 | L7 |
| 411775 | | L1 | L2 | L3 | L4+(λ/2) | L5 | L6 | L7 |
| 411776 | | L1 | L2 | L3 | L4 | L5+(λ/2) | L6 | L7 |
| 411777 | | L1 | L2 | L3 | L4 | L5 | L6+(λ/2) | L7 |
| 411778 | | L1 | L2 | L3 | L4 | L5 | L6 | L7+(λ/2) |
| 411779 | | L1+(λ/2) | L2 | L3 | L4 | L5 | L6 | L7 |
| 411780 | | L1+(λ/2) | L2 | L3 | L4 | L5 | L6 | L7 |
| · | | · | · | · | · | · | · | · |
| · | | · | · | · | · | · | · | · |
| 823542 | | L1+3(λ/2) | L2+3(λ/2) | L3+3(λ/2) | L4+3(λ/2) | L5+3(λ/2) | L6+3(λ/2) | L7+2(λ/2) |
| 823543 | | L1+3(λ/2) | L2+3(λ/2) | L3+3(λ/2) | L4+3(λ/2) | L5+3(λ/2) | L6+3(λ/2) | L7+3(λ/2) |

MEASURING DEVICE FOR COEFFICIENT OF THERMAL EXPANSION AND MEASUREMENT METHOD FOR COEFFICIENT OF THERMAL EXPANSION

The entire disclosure of Japanese Patent Application No. 2017-167666 filed Aug. 31, 2017 is expressly incorporated by reference herein.

TECHNICAL FIELD

The present invention relates to a measuring device for a coefficient of thermal expansion (hereinafter referred to as "CTE measuring device") and a measurement method for a coefficient of thermal expansion (hereinafter referred to as "CTE measurement method").

BACKGROUND ART

A CTE measuring device configured to accurately measure the coefficient of thermal expansion (hereinafter occasionally abbreviated as "CTE") of a substance has been known (for instance, see Patent Literature 1: Japanese Patent No. 3897655).

A CTE $\alpha$ can be calculated by the following formula (1), in which L represents a length of an object at a standard temperature, $\Delta T$ represents a temperature variation from the standard temperature (a temperature at measurement−standard temperature), and $\Delta L$ represents a variation in length (thermal expansion) as a result of changing the temperature of the object from the standard temperature by $\Delta T$.

$$\alpha = \frac{\Delta L}{L} \cdot \frac{1}{\Delta T} \quad (1)$$

In the formula (1), $\Delta L/L$ is a value in $10^{-5}$ order, so that the accuracy of $\Delta L$ is important to enhance the accuracy of a value of $\Delta L/L$. To highly accurately calculate the CTE $\alpha$, the temperature variation $\Delta T$ and the thermal expansion $\Delta L$ need to be accurately measured. The temperature variation $\Delta T$ can be calculated with a sufficient accuracy using an industrial high-precision thermometer.

Meanwhile, the thermal expansion $\Delta L$ can be measured, for instance, using an optical interferometer such as Michelson interferometer and Twyman-Green interferometer. In the use of such an optical interferometer, the thermal expansion $\Delta L$ is indirectly calculated based on the pieces of absolute dimension measurement data of the object independently obtained by a plurality of times of measurement as disclosed in, for instance, Patent Literature 1.

In measuring the absolute dimension using the optical interferometer, the length of the object is calculated by the following formula (2).

$$L = \frac{\lambda}{2}(N + \varepsilon) \quad (2)$$

In the formula (2), N represents an order of interference (integer) and $\varepsilon$ represents a fraction. An actually measurable value using the optical interferometer is only the fraction $\varepsilon$ and thus the actually measurable value is a half wavelength of measurement light or less. Meanwhile, the order of interference N is estimated from a preliminary value of the dimension. Thus, if the order of interference N is incorrectly determined, the value will be offset in the integral multiples of a half wavelength.

To calculate the CTE, measurement of the temperature and the length is repeated for a plurality of times with changes in the temperature of the object and a linear approximation function is derived from the measurement results. The CTE is obtained from the gradient of the function. Hereinbelow, each measurement of the temperature and the length provides a single piece of measurement data (temperature and length), and a set of data obtained by repeating the measurement for a plurality of times with changes in the temperature of the object is referred to as an actual data set.

FIG. 15 shows an exemplary actual data set obtained when the orders of interference N are correct. FIG. 16 shows an exemplary actual data set obtained when the orders of interference N are partly incorrectly determined.

The examples shown in FIGS. 15 and 16 are each an actual data set obtained by measurement performed at seven temperatures in a range of $20\pm\Delta t$ degrees C. As shown in FIG. 15, when the orders of interference N are correct, the linear approximation function derived from each data is consistent with a normal relationship between the temperature and length of the object. The CTE $\alpha$ can be obtained by the formula (1), where a gradient ($\Delta L/\Delta T$) of the linear approximation function is divided by a length L of the object.

In contrast, FIG. 16 shows the example where the order of interference N is set smaller than the actual value in measuring the length at a temperature of 20−$\Delta t$ degrees C. and larger than the actual value in measuring the length at a temperature of 20+$\Delta t$ degrees C. Referring to the example shown in FIG. 16, the CTE $\alpha$ is calculated to be larger than the actual value as a result of incorrectly setting the orders of interference N.

The above-described order of interference N is estimated from a preliminary measurement value obtained by preliminarily measuring the dimension of the object using an optical interferometer. When the optical interferometer uses a single-wavelength light source, the preliminary measurement value needs to have an accuracy equal to or less than the half wavelength with respect to the true value of the dimension of the object. For instance, in the use of a laser beam with a wavelength of 633 nm, the preliminary measurement value needs to have an accuracy in an acceptable range of approximately 300 nm or less with respect to the true value of the dimension of the object. Such a required accuracy is so difficult to achieve that the order of interference N is highly likely to be incorrectly determined.

Accordingly, a coincidence method using light sources with a plurality of wavelengths is sometimes used to expand the acceptable range of the preliminary value. For instance, with the use of a light source configured to emit a laser beam with a wavelength of 633 nm and a light source configured to emit a laser beam with a wavelength of 543 nm, the acceptable range can be expanded up to 1.9 µm with respect to the true value of the dimension of the object. However, the above method requires a light source for each of a plurality of wavelengths of light. In other words, a plurality of light sources need to be prepared with increased costs and, further, periodic maintenance, such as wavelength calibration, needs to be performed on the plurality of light sources with increased maintenance costs.

Moreover, if one of the light sources malfunctions but an alternative device cannot be readily prepared, measurement needs to be performed only using a single-wavelength light.

In this case, the order of interference N is highly likely to be incorrectly determined as described above. Otherwise, to enhance the measurement accuracy, the measurement needs to be suspended until the alternative device is prepared.

SUMMARY OF THE INVENTION

In view of the above problems, an object of the invention is to provide a CTE measuring device and a CTE measurement method that allow for continuous highly accurate measurement.

According to an aspect of the invention, a coefficient-of-thermal-expansion measuring device includes: a temperature detector configured to detect a temperature of an object; an optical interferometer configured to measure a length of the object using a single-wavelength light; an actual data acquiring unit configured to: sequentially change the temperature of the object to temperatures Ti in a range of i=1 to k; and acquire actual data Li of the length of the object measured by the optical interferometer at each of the temperatures Ti; a data set generating unit configured to: generate a plurality of pieces of verification data Di for the actual data Li at each of the temperatures Ti by setting an order of interference within a predetermined range; select one of the pieces of verification data Di at each of the temperatures Ti in the range of i=1 to k; and generate a plurality of data sets each containing the selected piece of verification data Di at each of the temperatures Ti, the plurality of data sets having different combinations of selection of the pieces of verification data Di; and a judging unit configured to: calculate a linear approximation function based on each of the plurality of data sets; and judge, using an evaluation index value based on respective differences of the pieces of verification data Di in each of the data sets from the linear approximation function, applicability of each of the data sets.

In the above aspect, a plurality of pieces of verification data Di for the actual data Li at each of temperatures Ti are generated by setting (changing) the order of interference within the predetermined range, and the plurality of data sets each containing one selected from the pieces of verification data Di at each of the temperatures Ti are generated. The number of the data sets corresponds to the total number of the combinations of the selected pieces of verification data Di. Further, the linear approximation function is calculated based on each of the data sets, and the applicability of each of the data sets is judged using an evaluation index value based on the difference between the linear approximation function and each of the pieces of verification data Di in each of the data sets.

In the above aspect, by comparing the evaluation index value based on the difference between the verification data Di and the linear approximation function, it can be determined whether the actual data Li matches the true value. Further, it can be determined which one of the data sets contains the verification data Di close to the true value and is applicable to measurement (calculation) of the coefficient of thermal expansion (CTE).

For instance, if the orders of interference of some pieces of actual data Li are incorrectly determined, the data set containing the pieces of verification data Di based on such pieces of actual data Li provides a large difference between some pieces of verification data Di and the linear approximation function. In contrast, if a verification data set group (generated data sets) includes a data set having a smaller evaluation index value, which means a difference from the linear approximation function is smaller (i.e., the pieces of verification data Di in this data set achieve a relationship shown in FIG. 15), the length measured at each of the temperatures Ti is highly likely to be correct. Accordingly, in the above aspect, the evaluation index value of each of the data sets is calculated to determine whether the actual data Li matches the true value of the length of the object at each of the temperatures Ti, thereby enhancing the reliability of the CTE measurement.

Further, the most suitable one of the data sets for calculating the CTE can be selected from the verification data set group, so that the CTE can be calculated based on the selected data set with high accuracy. In other words, the CTE can be corrected if the actual data Li has an error due to the order of interference being incorrectly determined.

Further, the above arrangement can improve the measurement accuracy of CTE irrespective of the use of the optical interferometer not including a plurality of light sources (i.e., unreliable in determining the order of interference). Additionally, the above arrangement eliminates the necessity of the use of a plurality of light sources, thus reducing the device costs. Further, since maintenance is required only for a single light source, the maintenance costs can also be reduced.

For the above reasons, the CTE measuring device of the above aspect allows for continuous highly accurate measurement.

In the above aspect, it is preferable that the coefficient-of-thermal-expansion measuring device further includes a coefficient-of-thermal-expansion calculator configured to calculate a coefficient of thermal expansion based on each of the plurality of data sets, in which the judging unit is configured to exclude any of the data sets that provides the coefficient of thermal expansion out of a predetermined first acceptable range.

In the above aspect, when the CTE of the object is substantially known, a CTE acceptable range (first acceptable range) is determined in advance and any data set providing the CTE out of this range is excluded. This prevents any data set that will provide an unreasonable CTE from becoming the candidate, thus allowing promptly and stably judging the applicability of the data set, that is, selecting the data set suitable for calculating the CTE.

In the above aspect, it is preferable that the evaluation index value is a representative value of the respective differences of the pieces of verification data Di in each of the data sets from the linear approximation function, and the judging unit is configured to judge the applicability of the first data set among the data sets that has a smallest evaluation index value.

In the above aspect, the judging unit calculates, as the evaluation index value, the representative value of the differences (residual errors) of the pieces of verification data in each of the data sets from the linear approximation function. The representative value may be a maximum value, an average value, or a root mean square. In this case, a small evaluation index value means that the values of the verification data are close to the linear approximation function, that is, the length of the object at each temperature is close to the true value and thus the order of interference is highly unlikely to be incorrect. Accordingly, by judging the applicability of the data set having the smallest evaluation index value, the data set suitable for calculating the CTE can be selected.

In the above aspect, it is preferable that the judging unit is configured to determine whether the smallest evaluation index value of the first data set falls within a predetermined second acceptable range.

When the evaluation index value is out of the second acceptable range, the actual data is highly likely to be incorrect for the true value of the length of the object even when the evaluation index value is the smallest. Accordingly, in the above aspect, it is determined whether the evaluation index value falls within the second acceptable range. This prevents the CTE from being calculated based on the incorrect data.

In the above aspect, the judging unit may be configured to determine whether a difference between the smallest evaluation index value of the first data set and a second smallest evaluation index value of a second data set among the data sets is at least a predetermined value.

When the first data set with the smallest evaluation index value is compared with the second data set with the second smallest evaluation index value to find that a difference between these evaluation index values is small, it is difficult to determine which one of the first data set and the second data set is correct. Accordingly, in the above aspect, it is determined whether the difference between the evaluation index values of the first data set and the second data set is at least the predetermined value to prevent the CTE from being calculated based on the incorrect data.

In the above aspect, it is preferable that the coefficient-of-thermal-expansion measuring device further includes an order range acquiring unit configured to acquire the range of the order of interference, in which the data set generating unit is configured to generate the verification data Di by setting the order of interference within the range of the order of interference acquired by the order range acquiring unit.

In the above aspect, the order of interference is increased or reduced within the range acquired by the order range acquiring unit to generate the pieces of verification data. In other words, the user can set a variation range of the order of interference as desired. The number of the data sets in the verification data set group is increased by increasing the variation range of the order of interference and reduced by reducing the variation range. Thus, if the CTE measurement needs to be performed soon or the CTE of the object is substantially known, the variation range of the order of interference may be reduced. In contrast, if the CTE of the object is not available (e.g., unknown), the variation range of the order of interference may be increased, thus allowing highly accurate measurement of the CTE even when the gradient $\Delta L/\Delta T$ is large.

In the above aspect, it is preferable that the actual data Li includes actual data Lf at a predetermined temperature Tf, and the data set generating unit is configured to calculate verification data Df for the actual data Lf by fixing the order of interference of the actual data Lf and to calculate the verification data Di for the rest of the actual data Li by setting the order of interference within the predetermined range.

In the above-described CTE measuring device, if a data set contains the piece of verification data Di with the order of interference that is increased (or reduced) from that of the piece of actual data Li at each of the temperatures Ti by the same increment, the data set is substantially translated in parallel.

Thus, a plurality of data sets with the same gradient ($\Delta L/\Delta T$) are generated. These data sets have the same evaluation index value (residual error) and thus provide the same CTE, so that two or more of the data sets may be ranked the same when the data sets are ranked in ascending order of the evaluation index values thereof. However, the presence of such data sets with the same rank is disadvantageous for identifying the data set suitable for calculating the accurate CTE and, additionally, leads to an increase in a load on an arithmetic operation.

Accordingly, in the above aspect, the verification data Di is generated by fixing the order of interference of actual data Lf at a certain temperature (regular temperature Tf) among the plurality of temperatures Ti and setting the orders of interference of the pieces of actual data Li at the other temperatures within the above range. In other words, the verification data Df at the regular temperature Tf always matches the actual data Lf in all the data sets. This can prevent the above-described generation of the data sets having the same evaluation index value.

In the above aspect, it is preferable that the actual data acquiring unit is configured to acquire the actual data Li resulting from changing temperature variations of the temperature of the object at irregular intervals.

The temperature may be changed at regular intervals. However, in this case, a specific variation pattern of the orders of interference may result in generation of the data sets having the same evaluation index value. For instance, a data set with the unchanged order of interference may have the same evaluation index value as another data set with the orders of interference being increased in increments of 1, although the data set with the unchanged order of interference is greatly different in CTE from the data set with the increased orders of interference. Accordingly, in the above aspect, the temperature is changed at irregular intervals so that different evaluation index values can be calculated even when the orders of interference have a specific variation pattern as described above, thus allowing accurate selection of the data set suitable for calculating the CTE.

According to another aspect of the invention, a coefficient-of-thermal-expansion measurement method for measuring a coefficient of thermal expansion of an object includes: sequentially changing a temperature of the object to temperatures Ti in a range of i=1 to k; acquiring actual data Li of a length of the object measured at each of the temperatures Ti using an optical interferometer configured to emit a single-wavelength light; generating a plurality of pieces of verification data Di for the actual data Li at each of the temperatures Ti by setting an order of interference within a predetermined range; selecting one of the pieces of verification data Di at each of the temperatures Ti in the range of i=1 to k; generating a plurality of data sets each containing the selected piece of verification data Di at each of the temperatures Ti, the plurality of data sets having different combinations of selection of the pieces of verification data Di; calculating a linear approximation function based on each of the plurality of data sets; and judging, using an evaluation index value based on respective differences of the pieces of verification data Di in each of the data sets from the linear approximation function, applicability of each of the data sets.

In this aspect, it can be determined whether the actual data Li matches the true value of the object in the same manner as in the above aspect. Further, a candidate for the data set for calculating the CTE can be selected from the verification data set group, so that the CTE can be corrected if the order of interference of the actual data Li has an error.

The above aspect can also improve the measurement accuracy of the CTE in the use of an optical interferometer not including a plurality of light sources (i.e., unreliable in determining the order of interference). Additionally, the above aspect eliminates the necessity of the use of a plurality of light sources. Thus, since maintenance is only required for a single light source, the device costs and maintenance costs can be reduced.

BRIEF DESCRIPTION OF DRAWING(S)

FIG. 1 schematically shows an arrangement of a CTE measuring device according to a first exemplary embodiment.

FIG. 2 schematically shows an example of a temperature control device according to the first exemplary embodiment.

FIG. 4 shows an exemplary verification data set group according to the first exemplary embodiment.

DESCRIPTION OF EMBODIMENT(S)

First Exemplary Embodiment

Description is made below on a CTE measuring device according to a first exemplary embodiment of the invention.

Figure 1:
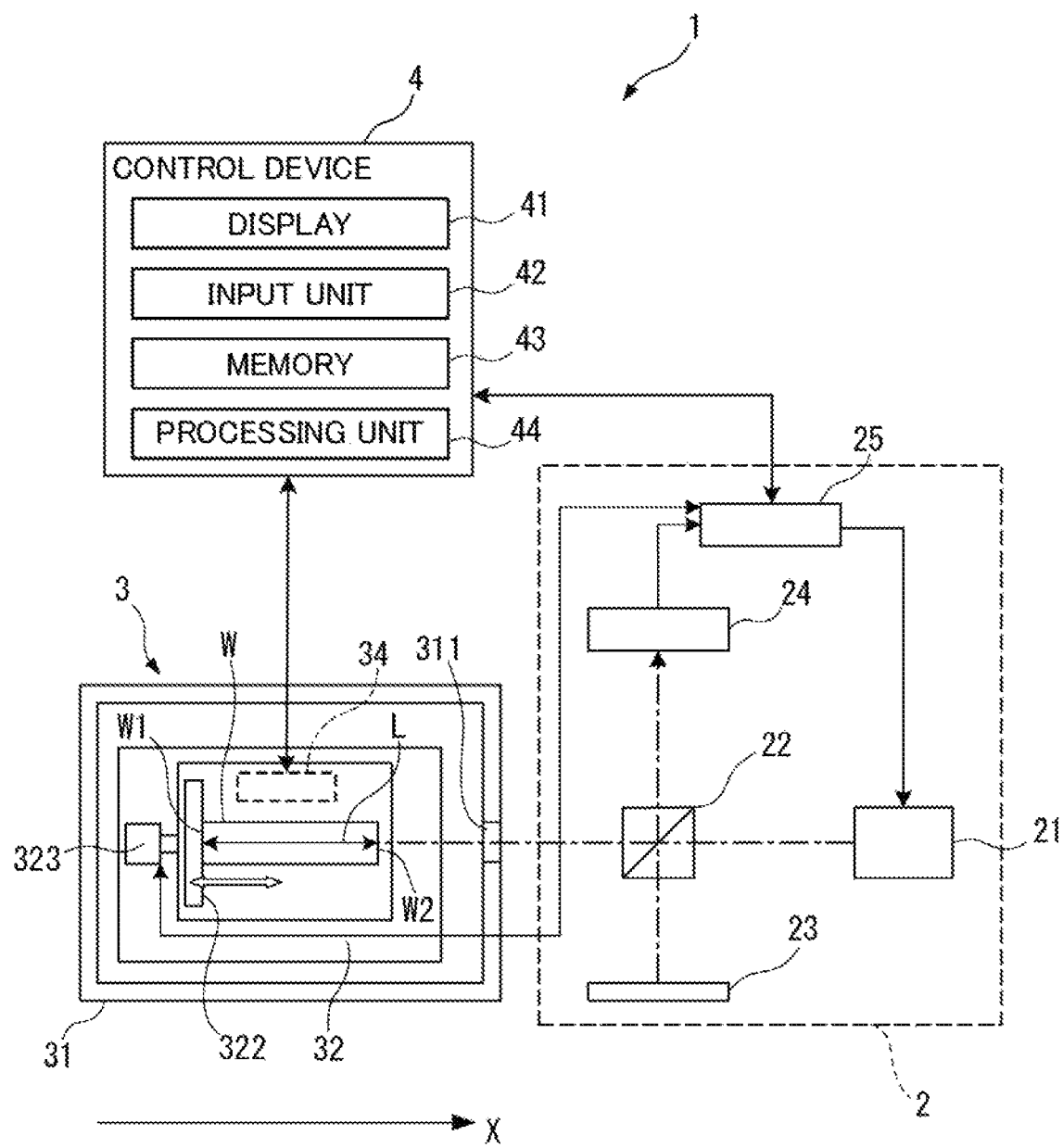

FIG. 1 schematically shows an arrangement of a CTE measuring device 1 according to the first exemplary embodiment.

As shown in FIG. 1, the CTE measuring device 1 includes an optical interferometer 2, a temperature control device 3, and a control device 4.

Arrangement of Temperature Control Device 3

Figure 2:
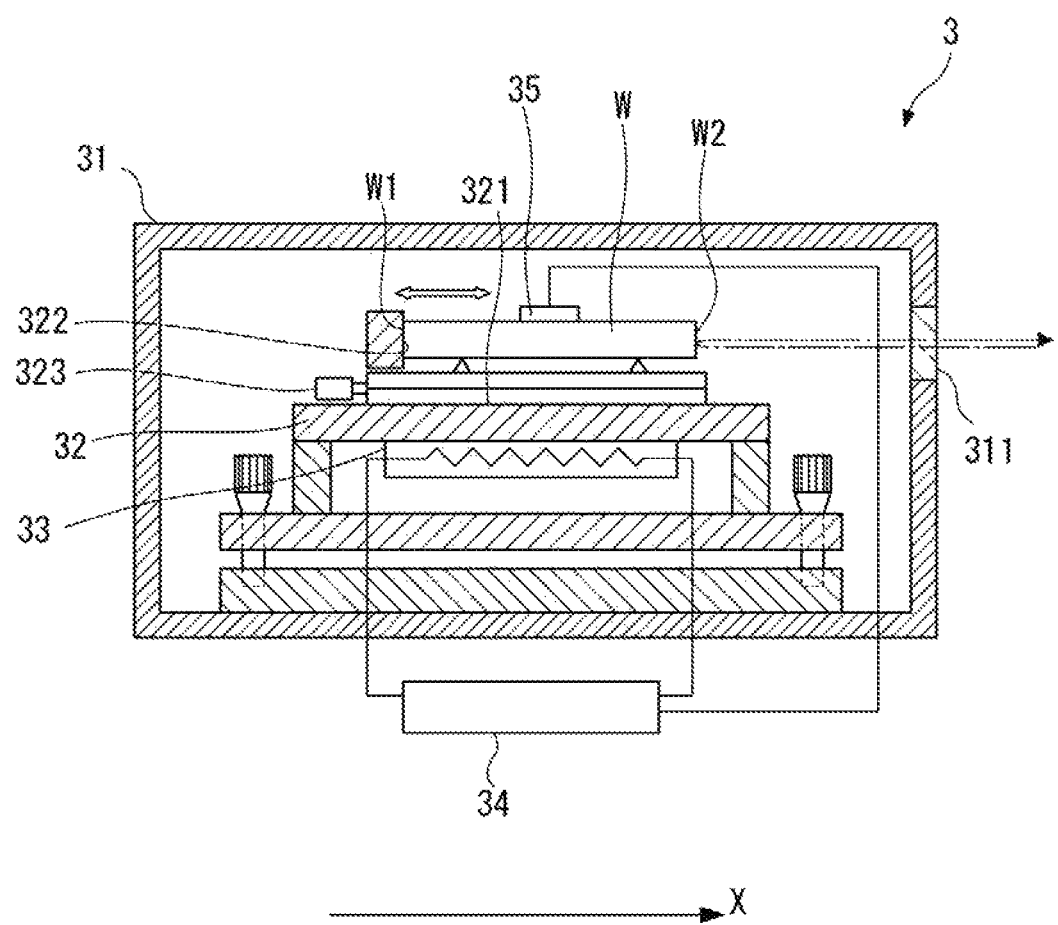

FIG. 2 schematically shows an example of the temperature control device 3.

The temperature control device 3, which corresponds to a temperature detector according to the invention, includes a variable temperature chamber 31 for accommodating an object W as shown in FIG. 2. The variable temperature chamber 31 includes walls made of a heat insulating material or an heat insulating layer. A table 32, which is made of a soaking plate, is installed in the variable temperature chamber 31, The table 32 has, for instance, a planar upper surface (mounting surface 321) on which the object W is to be mounted.

The table 32 also has a reference flat surface 322 that is perpendicular to the mounting surface 321 and to a traveling direction (X axis) of light emitted from the optical interferometer 2. The object W is mounted on the table 32 such that a lower surface of the object W is supported at an Airy point or a Bessel point by, for instance, a beam on the mounting surface 321 and a first end surface W1 of the object W in a length measuring direction is in close contact with the reference flat surface 322.

The reference flat surface 322 is movable in the X-axis direction. A motion control mechanism 323 is provided to the table 32 to move the reference flat surface 322 and detect a displacement thereof. The motion control mechanism 323, which is connected to the optical interferometer 2, is configured to output the detected displacement to the optical interferometer 2.

The variable temperature chamber 31 is provided with a window 311, through which a laser beam enters, at a position opposite the reference flat surface 322. The window 311 is made of, for instance, glass and a laser beam from the optical interferometer 2 passes therethrough.

The table 32 is also provided with a heater 33 and a temperature controller 34 connected to the heater 33. Further, a temperature sensor 35 is attached to the object W on the table 32 and the temperature sensor 35 is connected to the temperature controller 34.

Thus, the temperature of the object W is detected by the temperature sensor 35 and the heater 33 is driven by the temperature controller 34 to heat the object W so that the temperature of the object W reaches a desired temperature.

Further, the temperature controller 34, which is connected to the control device 4, is configured to output the temperature of the object W detected by the temperature sensor 35 to the control device 4.

Arrangement of Optical Interferometer 2

As shown in FIG. 1, the optical interferometer 2 includes a laser source 21, a beam splitter 22, a reflective mirror 23, a receiver unit 24, and a measurement controller 25.

The laser source 21 is configured to emit a laser beam with a single wavelength $\lambda$. The laser source 21 may be a wavelength-stabilized He—Ne laser source capable of emitting a laser beam with $\lambda$=633 nm.

The beam splitter 22 is configured to split the laser beam from the laser source 21 into a measurement light directed to a second end surface W2 of the object W and a reference light directed to the reflective mirror 23. The beam splitter 22 is also configured to synthesize the measurement light reflected on the second end surface W2 of the object W and the reference light reflected on the reflective mirror 23 into an interference light. Further, the beam splitter 22 is configured to split the laser beam from the laser source 21 into a measurement light directed to the reference flat surface 322, which is held in close contact with the first end surface W1 of the object W, and a reference light directed to the reflective mirror 23. The beam splitter 22 is also configured to synthesize the measurement light reflected on the reference flat surface 322 and the reference light reflected on the reflective mirror 23 into an interference light.

The reflective mirror 23 is aligned with, for instance, a direction perpendicular to a direction toward the object W. A distance between the reflective mirror 23 and the beam splitter 22 may be changeable so that interference fringes are phase-shifted for measurement.

The receiver unit 24 is configured to receive the interference light synthesized by the beam splitter 22 and output a signal corresponding to the light intensity to the measurement controller 25.

The measurement controller 25, which is connected to the laser source 21, the receiver unit 24, and the motion control mechanism 323, is configured to, for instance, control the emission of the laser beam from the laser source 21, estimate a preliminary measurement value, and perform length measurement based on the light-receiving signal from the receiver unit 24.

The measurement controller 25 is configured to measure a length L (actual data $Li=(\lambda/2)\times(N+\varepsilon)$) of the object W using the formula (2) and output the measured value to the control device 4.

As described above, a value measured by the optical interferometer 2 based on the signal from the receiver unit 24 is a value of the fraction $\varepsilon$.

The order of interference N is estimated by performing preliminary measurement. For instance, the reference flat surface 322 is moved to a position corresponding to each of the first end surface W1 and the second end surface W2 of the object W by the motion control mechanism 323 to cause interference of white light, and preliminary measurement is performed using a distance (displacement) between the first end surface W1 and the second end surface W2 as a preliminary measurement value L' of the object W. The measurement controller 25 divides the preliminary measurement value L' by $\lambda/2$ to obtain an integer part, thus estimating the order of interference N.

The measurement controller 25 determines the length of the object W by the formula (2) using the order of interference N estimated by the above-described preliminary measurement and the fraction $\varepsilon$ obtained by measuring the object W, and outputs the determined length as the actual data Li to the control device 4.

Arrangement of Control Device 4

The control device 4, which may be a computer such as a personal computer, includes a display 41, an input unit 42, a memory 43, and a processing unit 44 as shown in FIG. 1.

The display 41 is configured to display, for instance, measurement results.

The input unit 42, which may be any input device such as a mouse and a keyboard, is configured to output an operation signal corresponding to an input operation by a user to the processing unit 44.

The memory 43 stores a variety of data for controlling the CTE measuring device 1 and a variety of programs.

Figure 3:
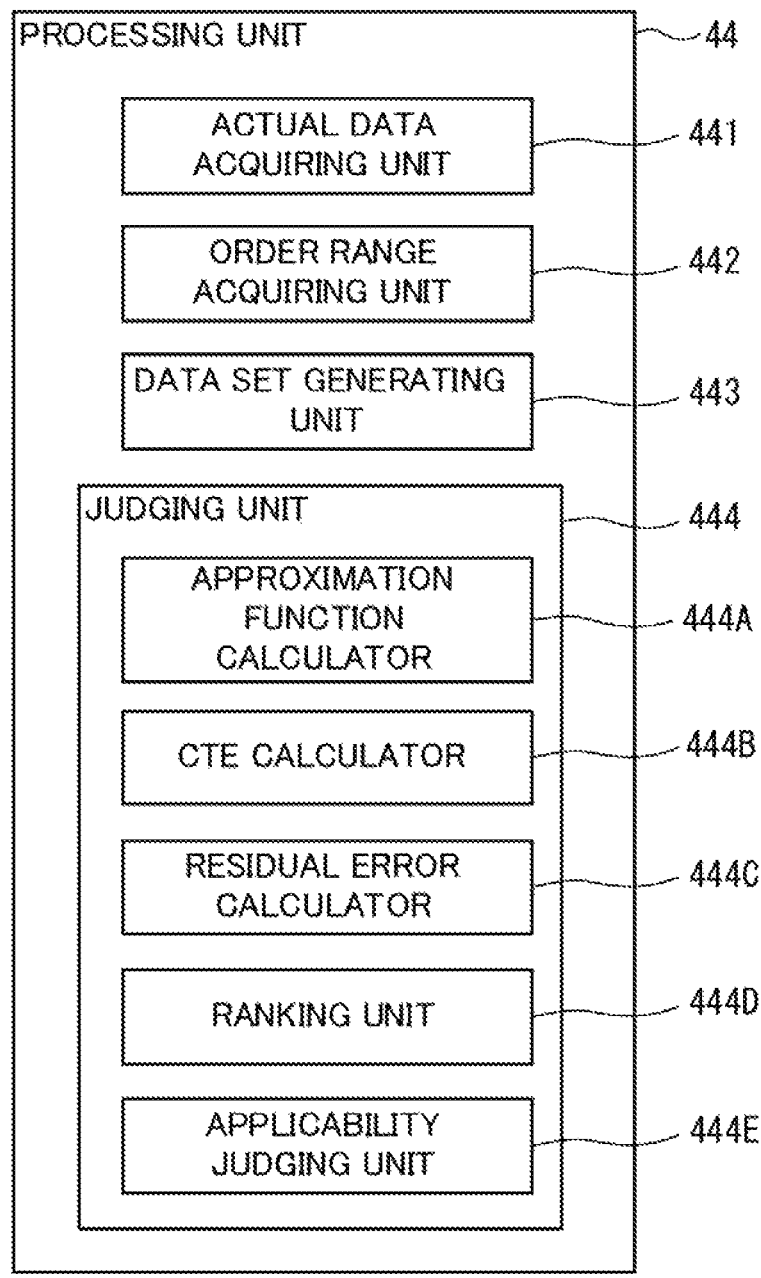
FIG. 3 is a block diagram showing functional components of a processing unit according to the first exemplary embodiment.

FIG. 3 is a block diagram showing functional components of the processing unit 44.

The processing unit 44, which includes an arithmetic circuit such as a central processing unit (CPU) and a storing circuit, is configured to perform a variety of processes by reading the variety of programs stored in the memory 43 and running these programs. Specifically, as shown in FIG. 3, the processing unit 44 functions as, for instance, an actual data acquiring unit 441, an order range acquiring unit 442, a data set generating unit 443, and a judging unit 444 in conjunction with the variety of programs.

The actual data acquiring unit 441 is configured to acquire temperatures Ti of the object W inputted from the temperature control device 3 (temperature controller 34) and the length (actual data Li) of the object W at each of the temperatures Ti inputted from the optical interferometer 2. In this exemplary embodiment, the temperatures Ti (i=1 to k) for measurement are sequentially changed and the length (actual data Li) of the object W is measured at each of the temperatures Ti, thus obtaining the actual data Li at each of the temperatures Ti. Thus-obtained pieces of actual data Li are referred to as an actual data set.

The order range acquiring unit 442 is configured to obtain a variation range of the order of interference for generating later-described verification data Di based on the operation signal from the input unit 42.

The data set generating unit 443 is configured to generate the verification data Di for each of the pieces of actual data Li in the actual data set by increasing or reducing the order of interference N in the formula (2).

For instance, when the order of interference varies in a range of ±n, the order of interference N in the formula (2) is increased or reduced to be set at an order of interference N' (N'=N−n, N−(n−1), N−(n−2) . . . N, . . . N+(n−2), N+(n−1), N+n), thus calculating pieces of verification data Di. In this case, the number of the pieces of verification data Di generated for the piece of actual data Li at each of the temperatures Ti is m=2n+1.

Here, the verification data Di is calculated by the following formula (3).

$$Di = \frac{\lambda}{2}(N' + \varepsilon) = \frac{\lambda}{2}(N \pm n + \varepsilon) = \frac{\lambda}{2}(N + \varepsilon) \pm \frac{\lambda}{2}n = L \pm \frac{\lambda}{2}n \quad (3)$$

The data set generating unit 443 can thus easily generate the pieces of verification data by increasing or reducing each of the pieces of actual data Li in increments or decrements of a half wavelength.

The data set generating unit 443 is also configured to generate a verification data set by changing combination of the generated pieces of verification data Di. Specifically, in measuring the actual data Li at each of the temperatures Ti in a range of i=1 to k, the number of the obtained pieces of actual data Li is k and the number of the obtained pieces of verification data for the piece of actual data Li at each of the temperatures Ti is m, so that the total number j of the data sets with different combinations is represented by $j=k^m$. A group of these data sets is hereinafter referred to as a verification data set group.

FIG. 4 shows an exemplary verification data set group. In the example shown in FIG. 4, the temperature of the object W is changed to each of seven values (k=7) and the order of interference is increased or reduced from the original order N in a range of ±3 (n=3). Thus, seven pieces of verification data Di are obtained for each piece of actual data Li and the total number j of the data sets with different combinations is $j=7^7=823543$.

The judging unit 444 includes an approximation function calculator 444A, a CTE calculator 444B (coefficient-of-thermal-expansion calculator), a residual error calculator 444C, a ranking unit 444D, and an applicability judging unit 444E.

The approximation function calculator 444A is configured to calculate a linear approximation function from the verification data Di in each of the verification data sets.

The CTE calculator 444B is configured to calculate a CTE α based on the above-described formula (1) by dividing the gradient ($\Delta L/\Delta T$) of the linear approximation function by the length L (actual data Li) of the object W.

The residual error calculator 444C is configured to calculate residual errors between the linear approximation function and the pieces of verification data Di and calculate a representative value (evaluation index value) of the residual errors.

The residual errors may be calculated based on the difference of the linear approximation function from the pieces of verification data Di or the differences of the pieces of verification data Di from the linear approximation function.

Figure 5:
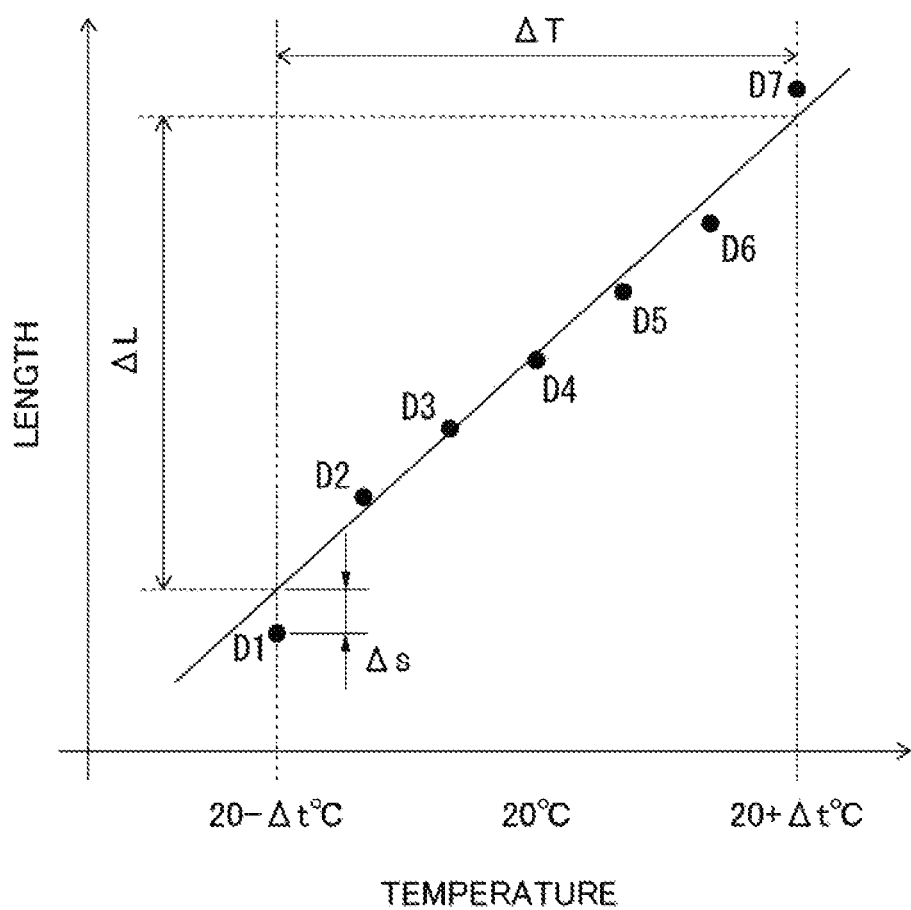
FIG. 5 is an illustration for explaining residual error calculation according to the first exemplary embodiment.

FIG. 5 is an illustration for explaining calculation of the residual errors according to this exemplary embodiment.

According to this exemplary embodiment, respective differences (residual errors Δs) of the pieces of verification data Di at the temperatures Ti from the linear approximation function are calculated as shown in FIG. 5. Further, for ranking the data sets and judging the applicability thereof, the representative value of these residual errors Δs is used as an evaluation index value s.

The representative value of the residual errors Δs used as the evaluation index value s may be the largest one of the respective absolute values of the residual errors Δs or may be an average value or a root mean square of the residual errors Δs or of the respective absolute values of the residual errors Δs.

The ranking unit 444D is configured to rank the data sets in ascending order of the evaluation index values s and determine the data set with the smallest evaluation index value s as a first candidate data set. Additionally, if the calculated CTE α is out of a predetermined first acceptable range, the ranking unit 444D excludes the data set corresponding to the CTE α out of the predetermined first acceptable range from the data sets being ranked.

The applicability judging unit 444E is configured to judge the applicability of the first candidate data set. Specifically, by selecting the CTE α corresponding to the first candidate data set, which has the smallest evaluation index value s, the CTE α can be corrected even if the order of interference N is incorrectly determined. However, variations and errors attributed to factors different from the order of interference N sometimes simultaneously occur. In such a case, the data set with the smallest evaluation index value s does not necessarily correspond to the correct CTE α.

Accordingly, the applicability judging unit 444E determines, for instance, whether the evaluation index value s of the first candidate data set falls within a predetermined second acceptable range, thus judging the applicability of the first candidate data set.

CTE Measurement Method

Figure 6:
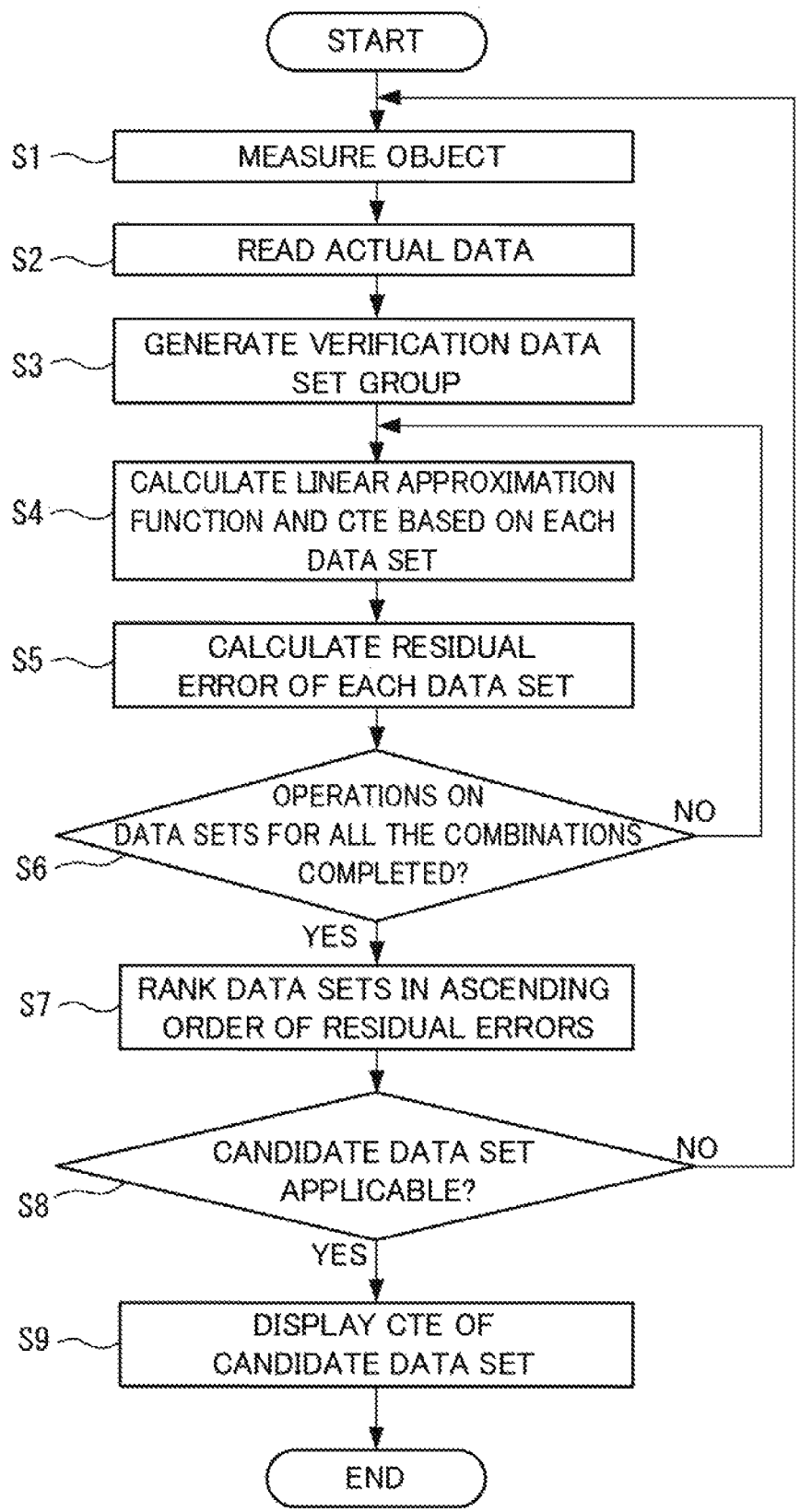
FIG. 6 is a flowchart showing a CTE measurement method according to the first exemplary embodiment.

Next, description is made on a CTE measurement method according to this exemplary embodiment. FIG. 6 is a flowchart showing the CTE measurement method.

In measuring the CTE of the object W, it is assumed that the order of interference N for the length of the object W is determined in advance by preliminary measurement. For instance, the reference flat surface 322 is moved by a displacement corresponding to the length of the object W and an integer part obtained by dividing the displacement by the half wavelength of the laser beam is taken as the order of interference N as described above.

In measuring the object W, the temperature control device 3 first sequentially changes the temperature of the object W to the temperatures Ti and, simultaneously, the optical interferometer 2 measures the actual data Li of the object W at each of the temperatures Ti. The obtained actual data Li is stored in the memory 43 (Step S1).

Next, the actual data acquiring unit 441 reads sequential pieces of actual data Li (i=1 to k) stored in the memory 43 (Step S2).

With reference to the read actual data Li, the data set generating unit 443 generates pieces of verification data Di by setting (changing) the order of interference N within a predetermined range (±n). Further, the data set generating unit 443 generates a verification data set group including data sets each containing one selected from the generated pieces of verification data Di at each of the temperatures Ti, the number of the data sets corresponding to the total number of the combinations of the selected pieces of verification data Di (Step S3).

Subsequently, the approximation function calculator 444A of the judging unit 444 calculates a linear approximation function of each of the data sets and the CTE calculator 444B calculates the CTE α based on each of the data sets using the formula (1) (Step S4).

Further, the residual error calculator 444C calculates the respective residual errors Δs of the pieces of verification data Di contained in each of the data sets with respect to the linear approximation function and determines the representative value of the residual errors as the evaluation index value s of the data set (Step S5).

The judging unit 444 determines whether the operations of Step S4 and Step S5 have been performed on the data sets for all the combinations (Step S6). When the determination result is No (the operations have not been completed), the process returns to Step S4.

When the determination result is Yes in Step S6, the ranking unit 444D ranks the data sets (Step S7).

Incidentally, any of the data sets with the CTE α, which is calculated in Step S4, out of the first acceptable range is excluded from the data sets being ranked. When the CTE α of the object W is a substantially known value, the first acceptable range is defined as a predetermined range around the substantially known value of the CTE α and can be increased or reduced depending on, for instance, a material of the object W. The first acceptable range may be inputted by a user using the input unit 42 and may be stored in the memory 43 in advance. If an approximate value of the CTE α of the object W is not available (e.g., unknown), the data sets may be ranked without excluding any of the data sets.

In Step S7, the data set with the smallest evaluation index value s (the representative value of the residual errors Δs) is determined as the first candidate data set.

Subsequently, the applicability judging unit 444E judges the applicability of the first candidate data set (Step S8).

The applicability judging unit 444E determines, for instance, whether the evaluation index value s of the first candidate data set falls within the predetermined second acceptable range. The second acceptable range, which can be set as desired depending on, for instance, the accuracy of the CTE α as required, may be inputted by a user using the input unit 42. In this case, when the evaluation index value s falls within the second acceptable range, the first candidate data set is determined to be applicable as being suitable as a data set for calculating the CTE α.

Alternatively, it may be determined whether a difference in evaluation index value s between the first candidate data set with the smallest evaluation index value s and a second candidate data set with the second smallest evaluation index value s is at least a predetermined value.

In other words, if the difference between the evaluation index values s of the first candidate data set and the second candidate data set is small, the second candidate data set would be data corresponding to the accurate CTE α depending on coincidences of variations and errors attributed to other factors. Accordingly, when the difference between the evaluation index values of the first candidate data set and the second candidate data set is at least the predetermined value, the first candidate data set is determined to be applicable.

The applicability may be judged by determining whether the evaluation index value s falls within the second acceptable range as described above and, additionally, by determining whether the difference between the evaluation index values s of the first candidate data set and the second candidate data set is at least the predetermined value as described above.

When the determination result is No in Step S8 (i.e., the evaluation index value s is out of the second acceptable range and/or the difference from the evaluation index value s of the second candidate data set is less than the predetermined value), the process returns to Step S1. In other words, when the determination result is No in Step S8, the CTE α calculated based on the first candidate data set is highly likely to contain an error. Accordingly, in this case, the actual data Li is preferably remeasured.

In contrast, when the determination result is Yes in Step S8, the CTE α calculated based on the first candidate data set is considered as the CTE α of the object W. In this case, for instance, the display 41 shows the CTE α based on the first candidate data set as the result of the CTE measurement (Step S9). Thus, even if the order of interference N is incorrectly determined in the actual data, the above-described process of this exemplary embodiment corrects the CTE α based on the actual data to the CTE α based on the first candidate data set, thus allowing highly accurate measurement of the CTE α.

Advantage(s) of Exemplary Embodiment(s)

In this exemplary embodiment, the temperature control device 3 sequentially changes the temperature of the object W to the temperatures Ti and the temperature sensor 35 detects each of the temperatures Ti of the object W. The optical interferometer 2 measures the length (actual data Li) of the object W at each of the temperatures Ti. The data set generating unit 443 of the control device 4 generates the plurality of pieces of verification data Di by setting the order of interference N of the actual data Li at each of the temperatures Ti within the predetermined range (±n), and generates the plurality of data sets each containing one selected from the pieces of verification data Di at each of the temperatures Ti, the number of the data sets corresponding to the total number of the combinations of the selected pieces of verification data Di. Subsequently, the judging unit 444 calculates the linear approximation function based on the pieces of verification data Di contained in each of the data sets and, further, calculates, as the evaluation index value s, the representative value of the respective residual errors Δs of the pieces of verification data Di relative to the calculated linear approximation function. The judging unit 444 then judges the applicability of the data set selected with reference to the evaluation index value s (whether the selected data set is correct).

By such judgment of the applicability based on the evaluation index value s, for instance, it can be determined whether the measured actual data Li is correct for the true value of the length of the object W with reference to the verification data Di generated from the actual data Li. Further, if the order of interference N is incorrectly determined in the actual data Li, a data set with a smaller evaluation index value s among other data sets, if any, can be selected as the first candidate data set. Thus, even if the actual data Li is incorrect, the CTE α can be accurately calculated based on the pieces of verification data Di in the first candidate data set. In other words, the optical interferometer 2 is allowed to measure the CTE α with high accuracy, although the optical interferometer 2 includes only a single-wavelength light source (i.e., unreliable in determining the order of interference N) instead of a plurality of light sources.

Further, the use of the optical interferometer 2, which does not include a plurality of light sources, leads to a reduction in, for instance, device costs and maintenance costs.

In this exemplary embodiment, the judging unit 444 calculates the CTE α based on each of the data sets in the verification data set group and excludes the data set(s) providing the CTE α out of the first acceptable range.

Specifically, when the CTE α of the object W is substantially known, the first acceptable range is defined around the known CTE α in advance and any data set providing the CTE α out of this range is excluded. This prevents any data set providing an unreasonable CTE α from becoming the candidate. Thus, the applicability of the data set can be promptly and stably judged so that the correct CTE α is promptly calculated.

In this exemplary embodiment, the judging unit 444 determines whether the evaluation index value s of the first candidate data set falls within the second acceptable range, and determines the first candidate data set to be suitable for calculation of the CTE α when the evaluation index value s falls within the second acceptable range. In contrast, when the evaluation index value s is out of the second acceptable range, the actual data Li is remeasured.

If the evaluation index value s of the first candidate data set is out of the second acceptable range, it means that there is a large difference between the linear approximation function and the verification data Di. Thus, the correct actual data Li is highly unlikely to be obtained. In this case, the CTE α calculated based on the first candidate data set is less likely to be correct. Accordingly, in this exemplary embodiment, the actual data Li is remeasured in such a case. This prevents the CTE α with low accuracy from being calculated.

In this exemplary embodiment, the judging unit 444 requests remeasurement of the actual data Li if a difference between the evaluation index value s of the first candidate data set and the evaluation index value s of the second candidate data set is less than the predetermined value. Specifically, if the evaluation index value s of the first candidate data set is close to that of the second candidate data set, the rank of the second candidate data set, which is actually correct, may be switched with that of the first candidate data set since the evaluation index value s of the second candidate data set is lowered by some other error factors and the like. In this case, the incorrect CTE α is likely to be calculated. Accordingly, in this exemplary embodiment, the actual data Li is remeasured in such a case. This prevents the CTE α with low accuracy from being calculated.

In this exemplary embodiment, the control device 4 includes the order range acquiring unit 442 that obtains the range of the order of interference. Thus, a user can set the order of interference N within a desired range to generate the verification data Di.

Second Exemplary Embodiment

Next, a second exemplary embodiment of the invention is described.

Figure 7:
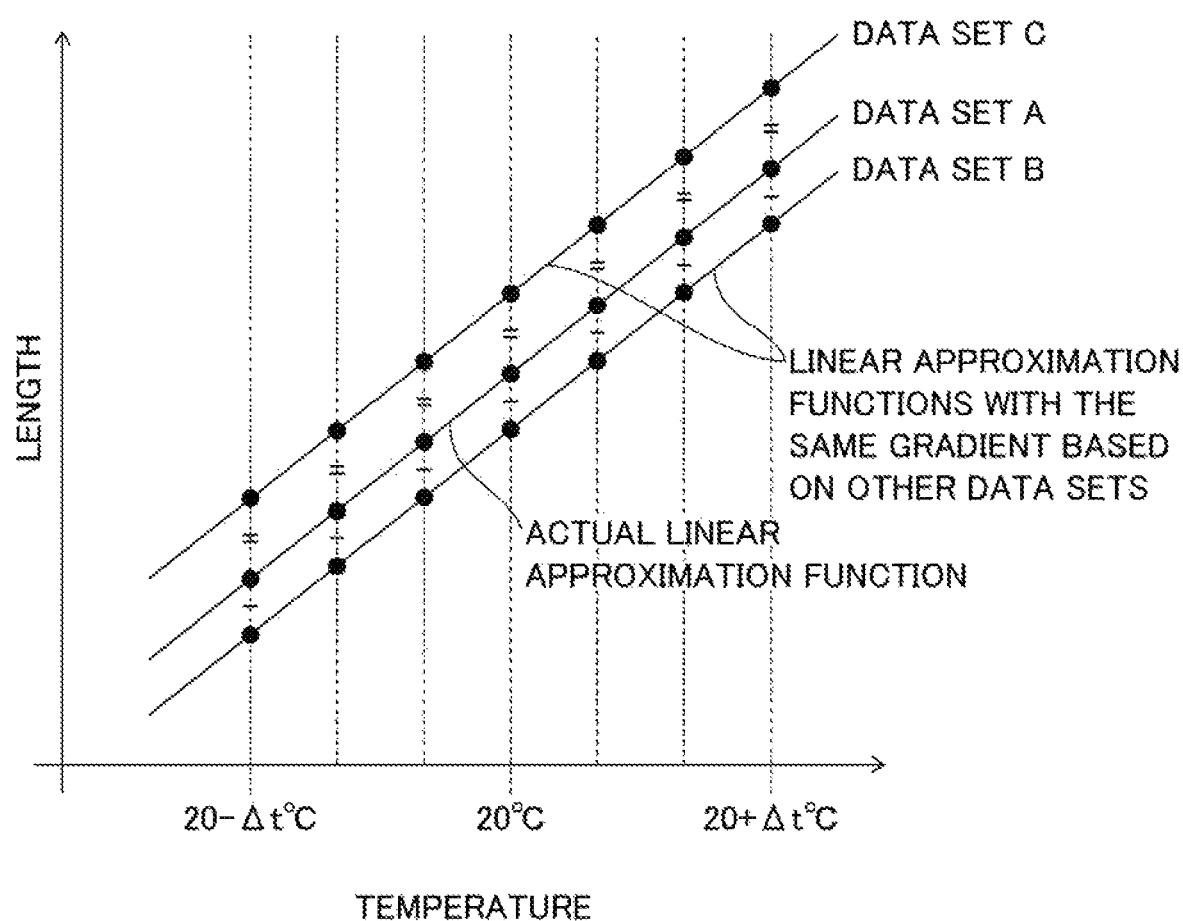
FIG. 7 shows an example of data sets that are the same in evaluation index value and CTE.

In the first exemplary embodiment, some data sets among the plurality of data sets are the same in evaluation index value s or CTE. FIG. 7 shows an example of the data sets that are the same in evaluation index value s and CTE.

Specifically, as shown in FIG. 7, a data set B and a data set C are translated in parallel to a data set A, the data set B containing pieces of verification data with the respective orders of interference that are reduced from those of the data set A by the same number (e.g., 1), the data set C containing the pieces of verification data with the respective orders of interference that are increased from the data set A by the same number (e.g., 1). The respective linear approximation functions of these data sets B, C are the same in gradient ($\Delta L/\Delta T$) as that of the data set A, while being different only in intercept. Thus, the CTE $\alpha$ and the evaluation index value s calculated based on each of the data sets B, C are the same as those of the data set A.

However, since the judging unit 444 ranks the data sets in ascending order of the evaluation index values s, the presence of the data sets that are ranked the same disadvantageously makes the process for identifying the correct data set unstable and, additionally, increases a load on an arithmetic operation.

Accordingly, to prevent generation of the data sets that are the same in evaluation index value s and/or CTE, the second exemplary embodiment is differentiated in the process of the data set generating unit 443 from the first exemplary embodiment.

The like reference characters are used hereinbelow to refer to the above-described parts, which are not explained again.

Figure 8:
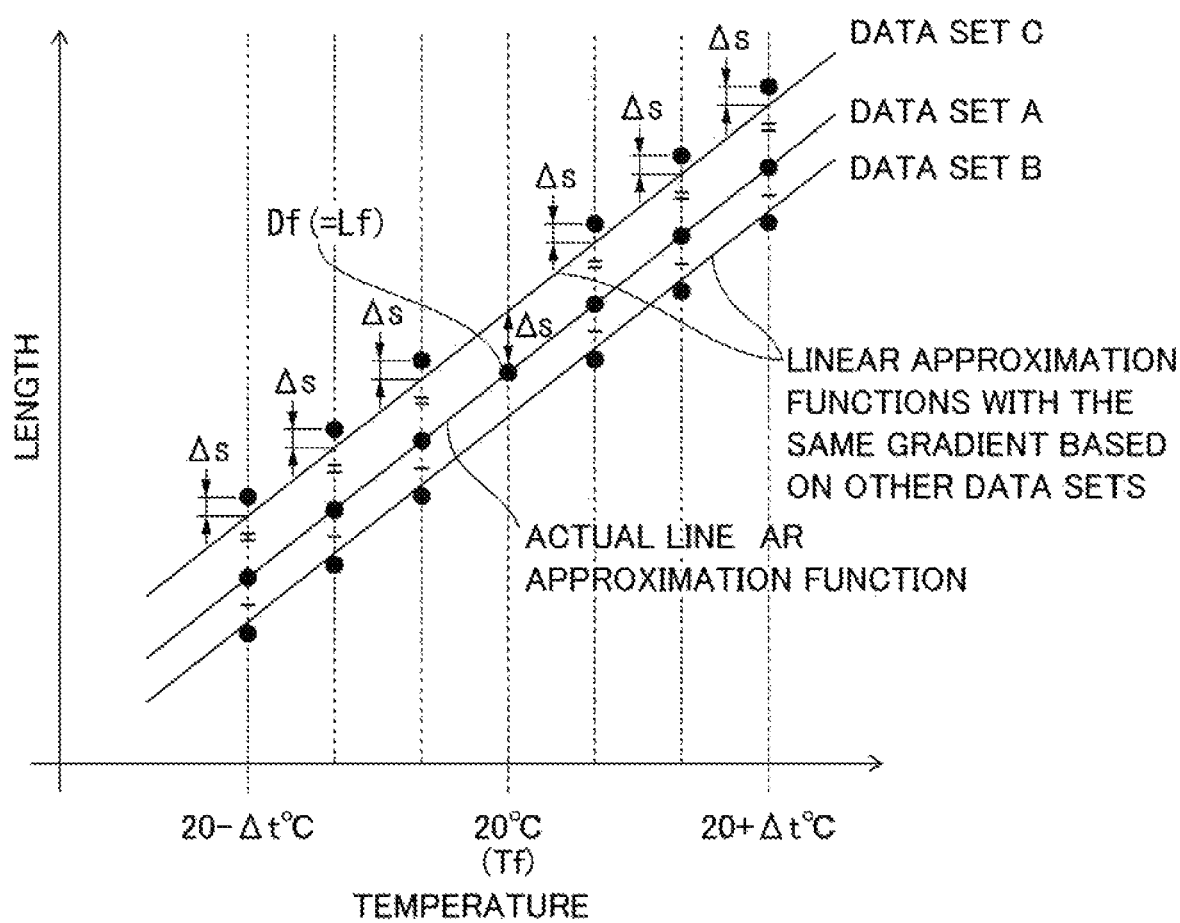
FIG. 8 shows an example of data sets according to a second exemplary embodiment.

FIG. 8 shows an example of data sets according to the second exemplary embodiment.

In this exemplary embodiment, the data set generating unit 443 does not generate verification data Df with the increased or reduced orders of interference N for actual data Lf obtained at a specific temperature (hereinafter referred to as "regular temperature Tf") in Step S3. In other words, only a single piece of verification data Df corresponding to actual data Lf (order of interference N) is used for the actual data Lf.

In the example of FIG. 8, the regular temperature Tf is set at 20 degrees C. According to the first exemplary embodiment, the data sets A, B, C are generated that are the same in gradient ($\Delta L/\Delta T$), CTE $\alpha$, and evaluation index value s as shown in FIG. 7. In contrast, according to the second exemplary embodiment, all the data sets have a single piece of verification data Df at the regular temperature Tf as shown in FIG. 8. Thus, the data sets A, B, C have different evaluation index values s while being the same in gradient. In the example of FIG. 8, the evaluation index values s of the data sets B, C are greater than that of the data set A.

Thus, in the process of the ranking unit 444D for selecting the first candidate data set, the data sets B, C are not ranked the same as the data set A.

This prevents some data sets from being selected as the first candidate data set, thus stabilizing the process and preventing an increased load on an arithmetic operation.

Third Exemplary Embodiment

Next, a third exemplary embodiment of the invention is described.

In the first exemplary embodiment and the second exemplary embodiment, temperature intervals $\Delta Ti$ (temperature variations) between temperatures for obtaining the actual data Li are exemplarily regular intervals. However, in such as a case, some data sets may be substantially the same in evaluation index value s while being different in CTE $\alpha$.

Figure 9:
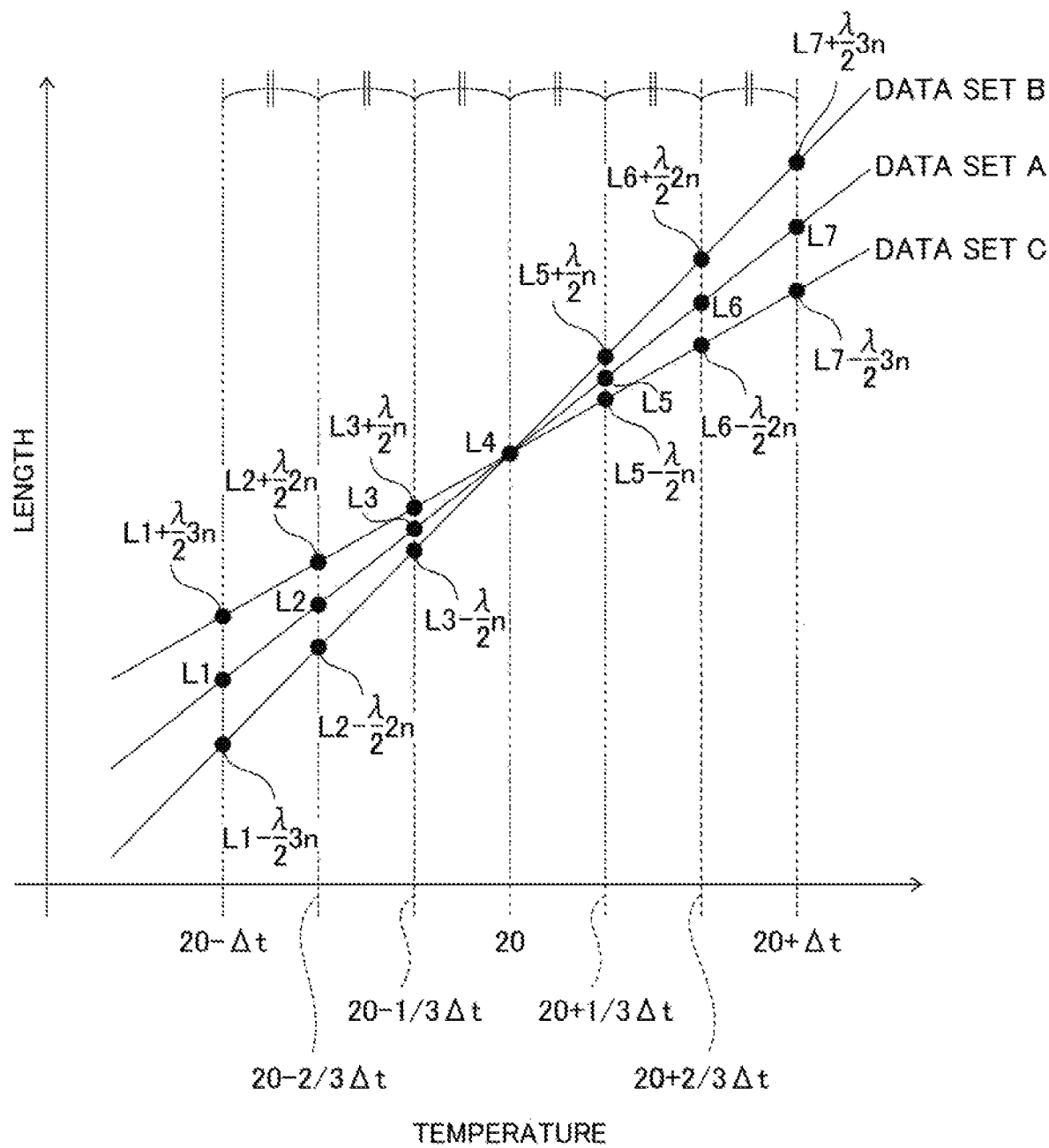
FIG. 9 shows an example of data sets that are different in CTE but substantially the same in evaluation index value.

FIG. 9 shows an example of data sets that are different in CTE but substantially the same in evaluation index value s.

Specifically, as represented by the formula (3), each of the pieces of verification data Di is a value obtained by adding/subtracting an integral multiple of the half wavelength to/from the actual data Li. Thus, if the data sets A, B, C include specific data sets in which one piece of verification data is the same and other pieces of verification data Di have the incremented or decremented orders of interference N, some of the data sets may be substantially the same in evaluation index value s.

For instance, an example shown in FIG. 9 is explained where the actual data Li is measured while the temperature is changed seven times in a range from 20−$\Delta t$ degrees C. to 20+$\Delta t$ degrees C. at regular intervals. It is assumed that the order of interference N has no error at each of these seven points and the data set A based on the actual data Li provides the correct CTE $\alpha$.

Here, the data set B contains verification data D4 (=L4) with the same order of interference as that of the data set A at 20 degrees C. In a part of the data set B at temperatures higher than 20 degrees C., the pieces of verification data Di (D5=L5+n×$\lambda$/2, D6=L6+2n×$\lambda$/2, D7=L7+3n×$\lambda$/2) are selected such that the order of interference N is increased by +1, +2 and +3 in this order (in increments of 1) as the temperature is away from 20 degrees C. Similarly, in a part at temperatures lower than 20 degrees C., the pieces of verification data Di (D3=L3−n×$\lambda$/2, D2=L2−2n×$\lambda$/2, D1=L1−3n×$\lambda$/2) are selected such that the order of interference N is decreased by −1, −2 and −3 in this order (in decrements of 1) as the temperature is away from 20 degrees C. The data set C contains, contrary to the data set B, the verification data with the order of interference N that is decreased in decrements of 1 at temperatures higher than 20 degrees C. and increased in increments of 1 at temperatures lower than 20 degrees C.

Figure 10:
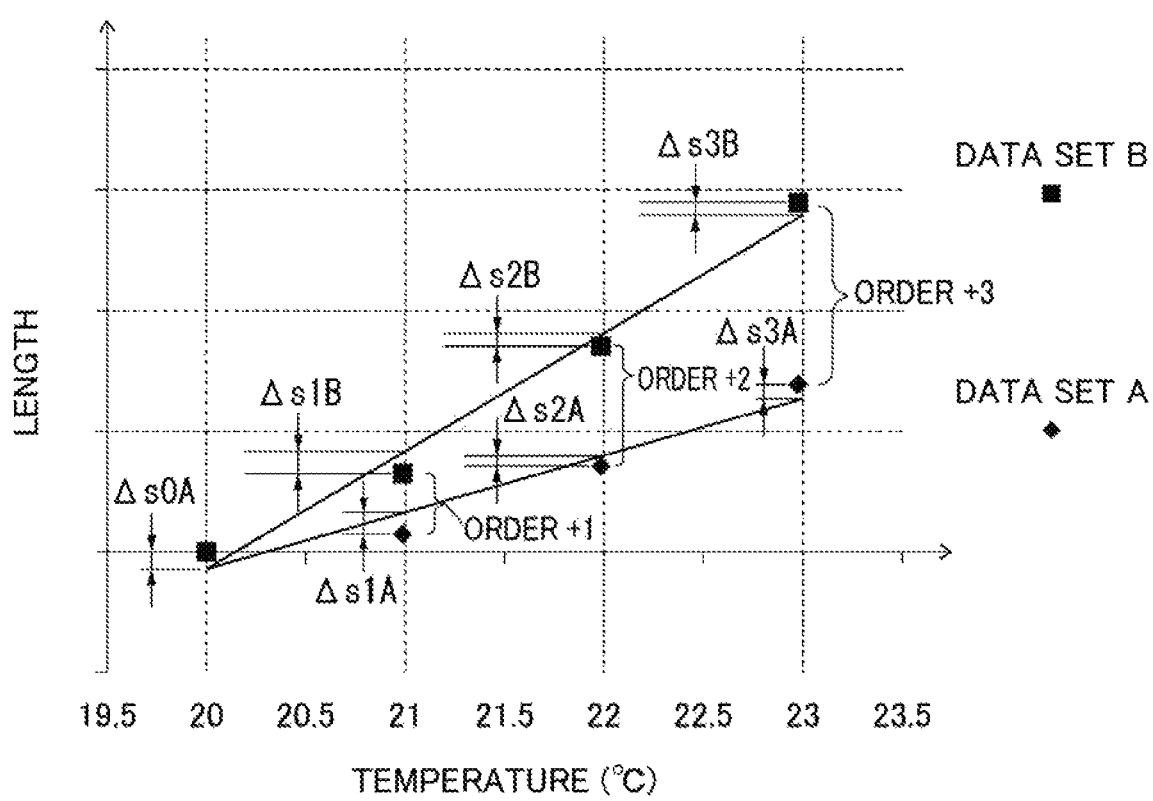
FIG. 10 shows the verification data and the linear approximation function of each of data sets A, B in FIG. 9 on an enlarged scale.
Figure 11:
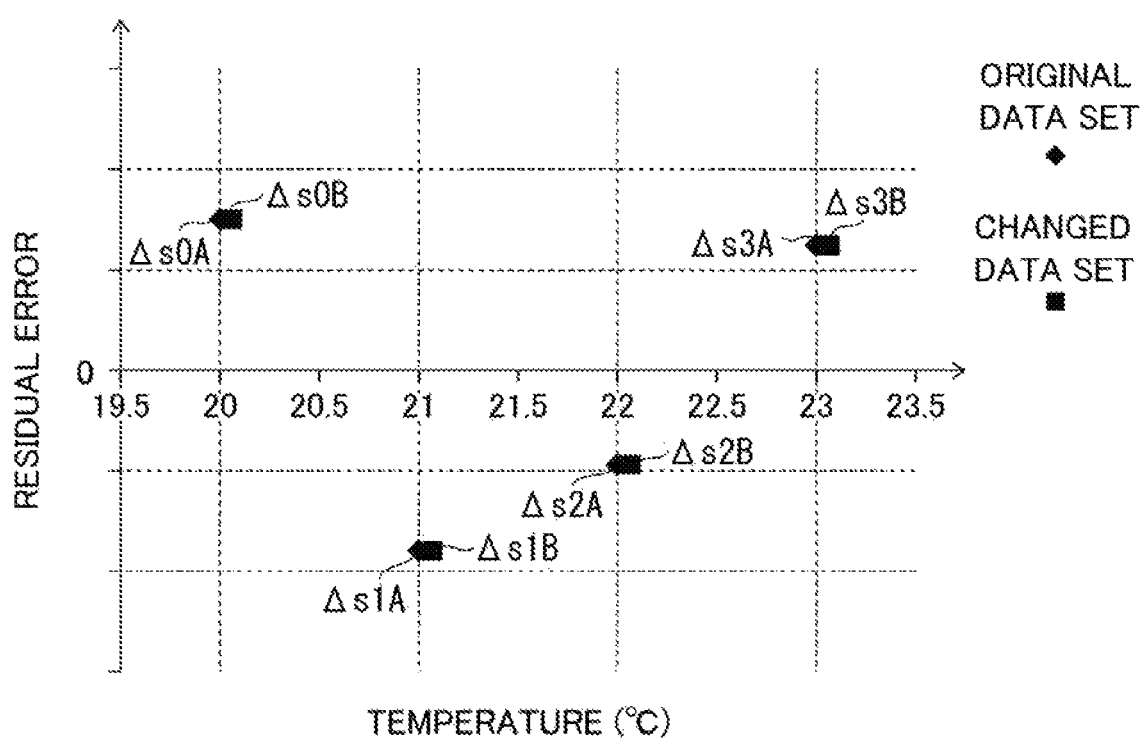
FIG. 11 shows residual errors in the data sets A, B in FIG. 9.

FIG. 10 shows the verification data Di and the linear approximation function of each of the data sets A, B in FIG. 9 on an enlarged scale. FIG. 11 shows the residual errors $\Delta s$ in the data sets A, B in FIG. 9.

The gradient ($\Delta L/\Delta T$) of the linear approximation function of the data set B is different from that of data set A as shown in FIG. 10, so that the CTE $\alpha$ calculated based on the data set B is also different. However, as shown in FIGS. 10 and 11, the residual errors $\Delta s$ of the data set B are substantially the same as those of the data set A. Thus, in the process of the ranking unit 444D for selecting the first candidate data set, the data set B or C may be ranked the same as the data set A. In such a case, the correct CTE cannot be identified.

Accordingly, in the third exemplary embodiment, the temperature intervals $\Delta Ti$ for obtaining the actual data Li are made irregular.

Figure 12:
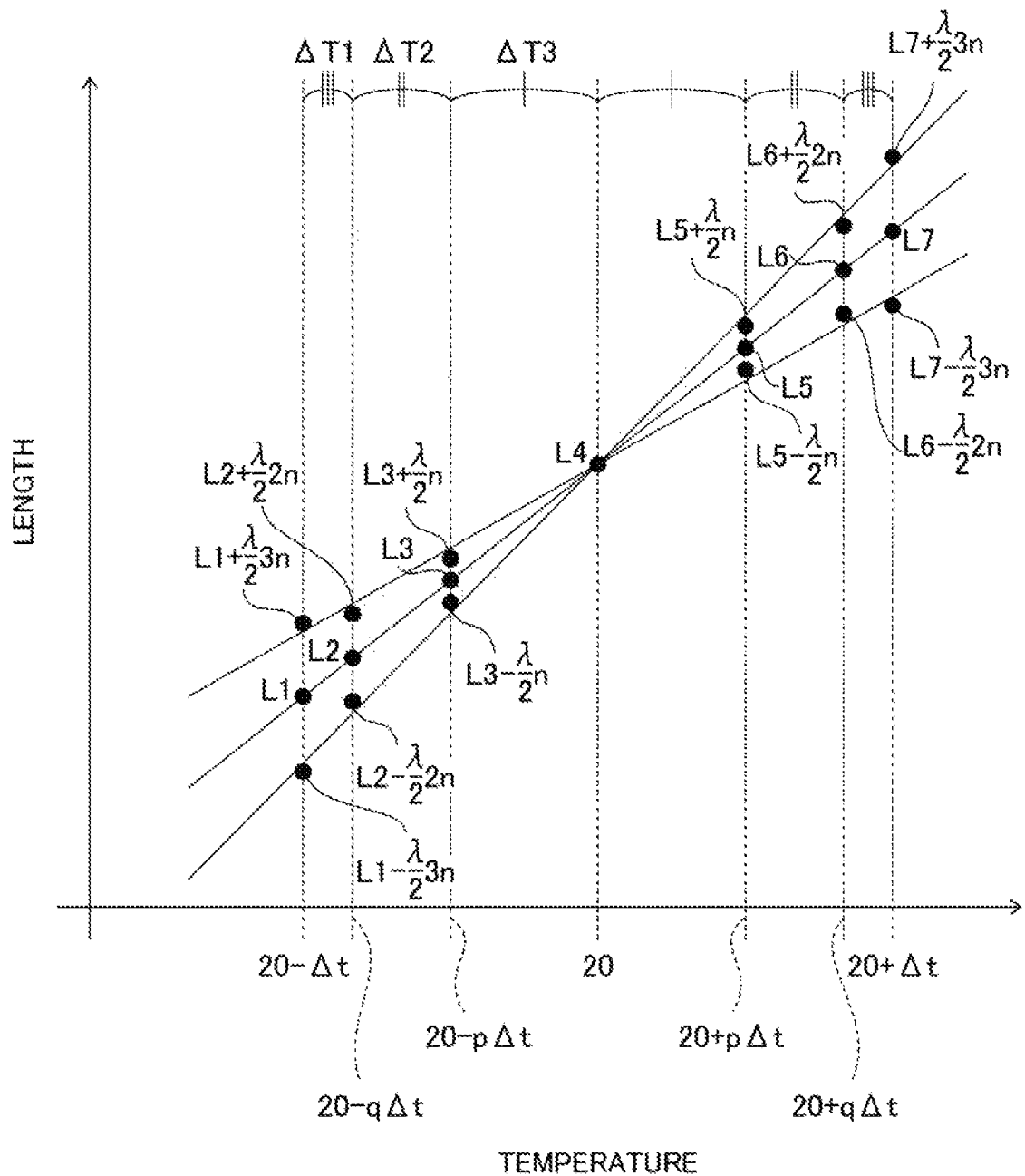
FIG. 12 is an example of a data set generated based on obtained actual data according to a third exemplary embodiment.

FIG. 12 is an example of a data set generated based on the actual data Li obtained according to the third exemplary embodiment. It is assumed that the data set A, which contains the verification data Di corresponding to the actual data Li having the order of interference N without an error, provides the correct CTE as in FIG. 9.

According to the third exemplary embodiment, in measuring the actual data Li of the object W at each of the temperatures Ti in Step S1, the temperature intervals $\Delta Ti$ for the temperatures Ti are made irregular. Such irregular intervals may be determined as desired. In the example shown in FIG. 12, the temperature is changed such that the temperature intervals $\Delta Ti$ are made symmetric with respect to 20 degrees C. However, only one of the temperature intervals $\Delta Ti$ may be differentiated from the others or all the temperature intervals $\Delta Ti$ may be differentiated from one another. Further, differentiating two or more of the temperature intervals ΔTi is more preferable than differentiating one of the temperature intervals, and differentiating all the temperature intervals ΔTi is further preferable.

Figure 13:
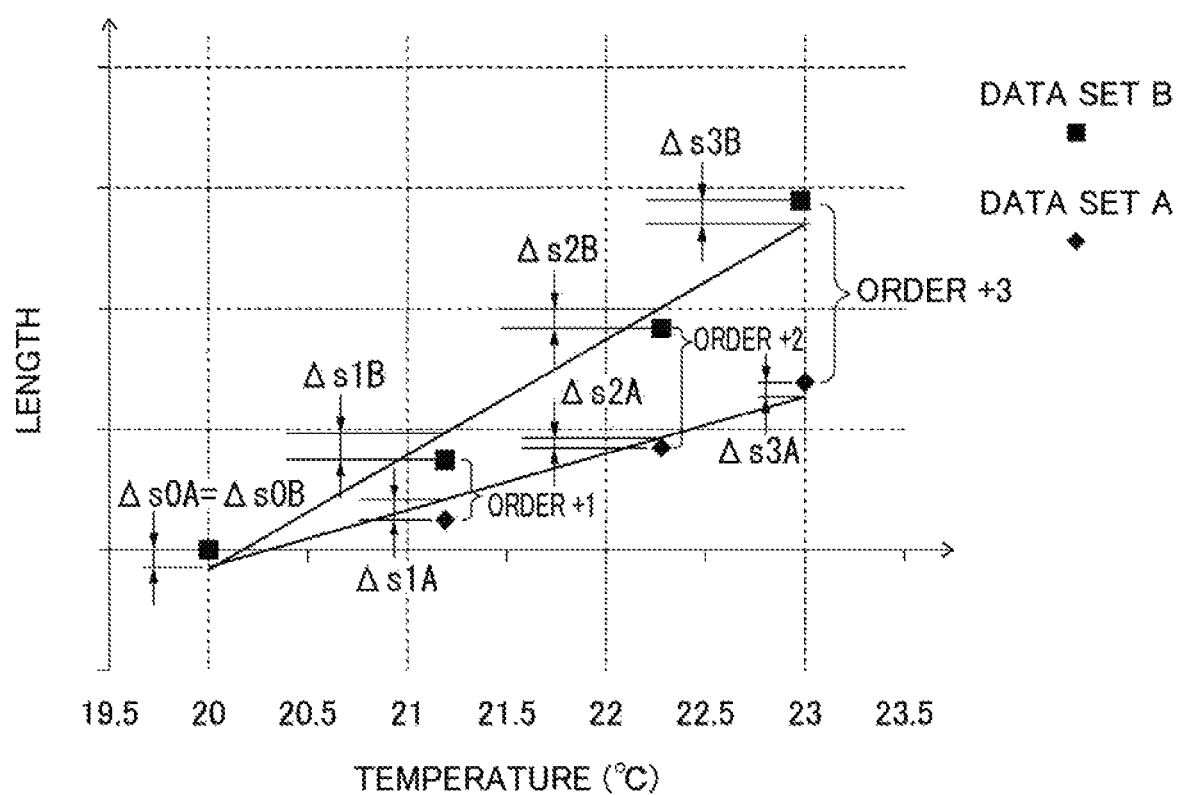
FIG. 13 shows the verification data and the linear approximation function of each of data sets A, B in FIG. 12 on an enlarged scale.
Figure 14:
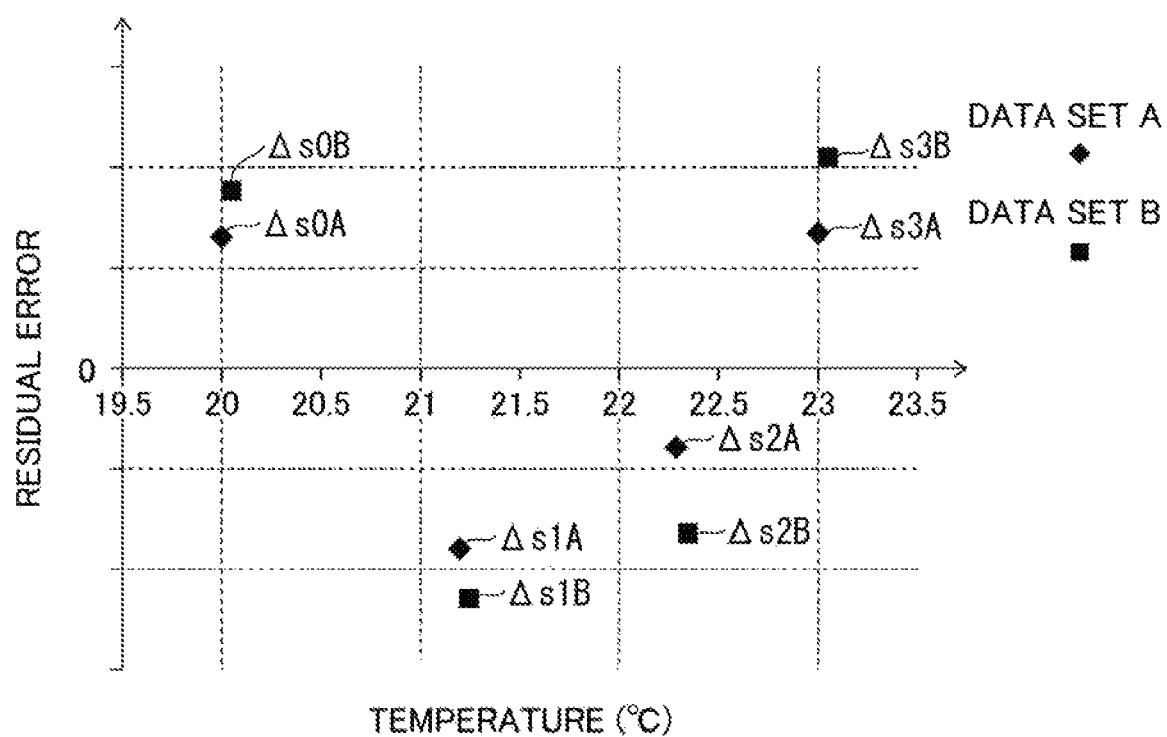
FIG. 14 shows residual errors in the data sets A, B in FIG. 12.
Figure 15:
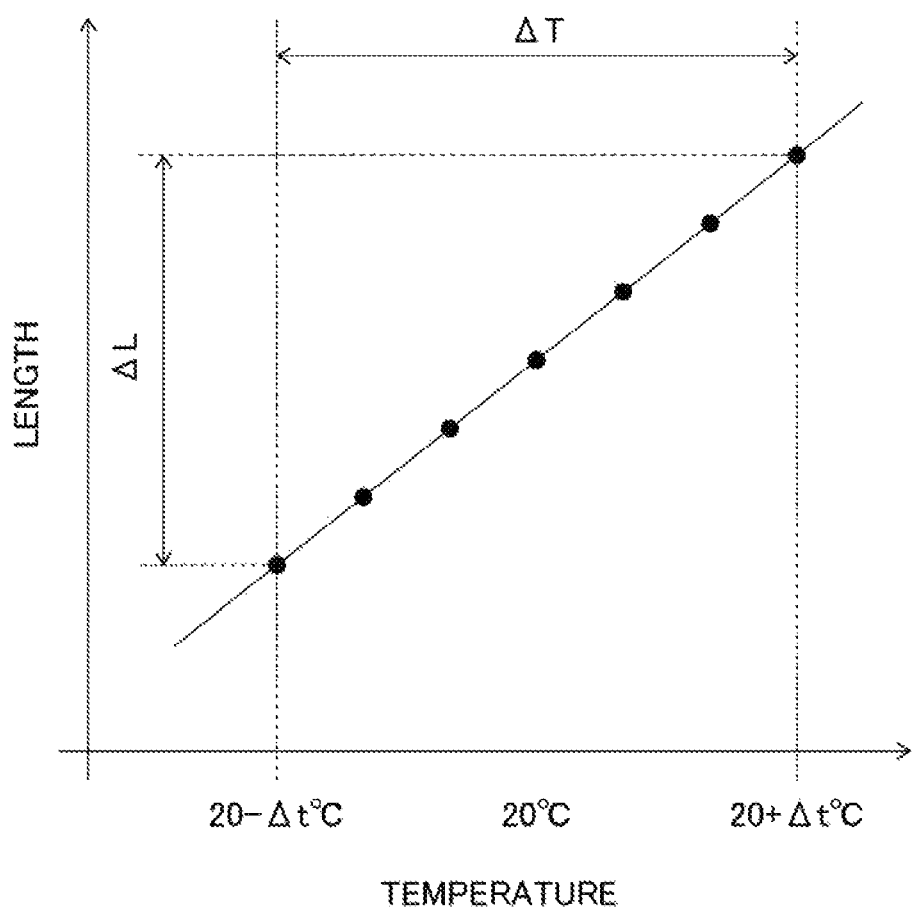
FIG. 15 shows an exemplary actual data set obtainable when orders of interference are correct.
Figure 16:
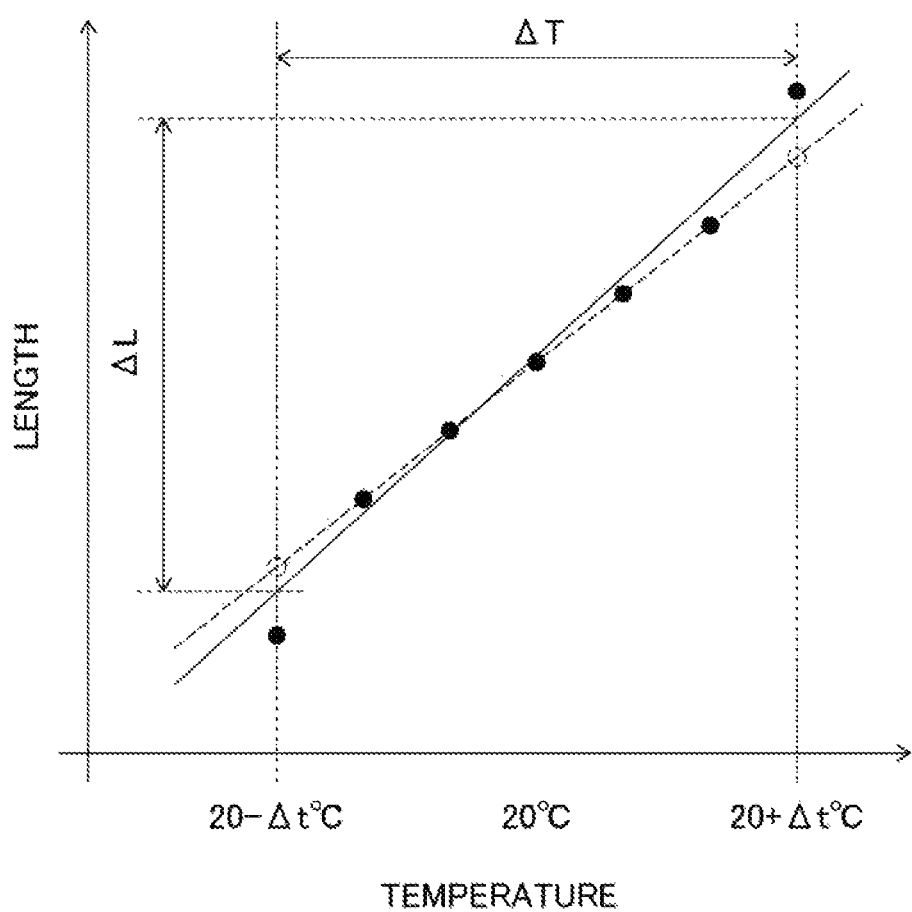
FIG. 16 shows an exemplary actual data set obtainable when the orders of interference are partly incorrectly determined.

FIG. 13 shows a part of each of the data sets A, B in FIG. 12 (a part at temperatures higher than 20 degrees C.) on an enlarged scale. FIG. 14 shows the residual errors Δs in FIG. 13.

As shown in FIG. 12, the data set B contains verification data D4 with the same order of interference as that of the data set A at 20 degrees C. Further, the data set B contains the pieces of verification data D5 to D7 with the orders of interference N being increased in increments of 1 at temperatures higher than 20 degrees C.

In this exemplary embodiment, the temperature intervals are irregular as shown in FIG. 12, so that the set temperatures are not proportional to the resulting order variations. Thus, the residual errors Δs of the data set A are different from those of the data set B as shown in FIG. 13.

This prevents two or more of the data sets from being selected as the first candidate data set, thus stabilizing the process. Further, the correct data set can be identified as the first candidate data set, thus allowing highly accurate calculation of the CTE α.

Modification(s)

Incidentally, it should be understood that the scope of the invention is not limited to the above-described exemplary embodiment(s) but includes any modifications and improvements not hampering the achievement of an object of the invention.

For instance, the CTE α is calculated based on the selected first candidate data set in the first exemplary embodiment. However, only the applicability of the actual data Li may be judged. For instance, if there is a data set having the evaluation index value s smaller than the evaluation index value s of a data set (actual data set) containing all the pieces of actual data Li, the actual data Li may be determined to include a piece of data with the incorrectly determined order of interference N and a display for urging remeasurement of actual data may appear on the display 41.

In the second exemplary embodiment, the actual data Lf is exemplarily always used as the verification data Df at the regular temperature Tf without changing the order of interference N of the actual data Lf. In the third exemplary embodiment, the temperature is exemplarily changed at the irregular intervals ΔTi. Instead of the above, the actual data Lf may be always used as the verification data Df at the predetermined regular temperature Tf as in the second exemplary embodiment and, further, the temperatures Ti may be changed at the irregular temperature intervals ΔTi.

In the above exemplary embodiments, the order of interference N is changed in the range of ±n in the process of the data set generating unit 443 for generating the verification data Di, but the invention is not limited thereto. For instance, the order of interference N may be changed in a range from −n1 to +n2 (n1≠n2).

In the first exemplary embodiment, the CTE α is calculated based on each of all the data sets in Step S4, but the invention is not limited thereto. For instance, if the data set(s) with the CTE α out of the first acceptable range is not excluded in Step S7, only the linear approximation function may be calculated without calculating the CTE α in Step S4. In this case, when the determination result is Yes in Step S8, only the CTE α based on the first candidate data may be calculated.

Alternatively, in the first exemplary embodiment, only the CTE α based on each of the data sets may be calculated without calculating the linear approximation function in Step S4. In this case, it may be determined whether the calculated CTE α falls within the first acceptable range so that the linear approximation function is calculated based on only the data set(s) having the CTE α within the first acceptable range.

In ranking the data sets in Step S7, as long as the first candidate data set and the second candidate data set are selected, it is not necessary to rank the other data sets. Further, if the applicability is not judged based on a difference between the evaluation index value s of the first candidate data set and the evaluation index value s of the second candidate data set in Step S8, only the first candidate data set is required to be selected. In other words, only the first candidate data set with the smallest evaluation index value s is required to be selected from the verification data set group, so that it is not necessary to rank the other data sets.

What is claimed is:

1. A coefficient-of-thermal-expansion measuring device comprising:
    a temperature detector configured to detect a temperature of an object;
    an optical interferometer configured to measure a length of the object using a single-wavelength light;
    an actual data acquiring unit configured to: sequentially change the temperature of the object to temperatures Ti in a range of i=1 to k; and acquire actual data Li of the length of the object measured by the optical interferometer at each of the temperatures Ti;
    a data set generating unit configured to: generate a plurality of pieces of verification data Di for the actual data Li at each of the temperatures Ti by setting an order of interference within a predetermined range; select one of the pieces of verification data Di at each of the temperatures Ti in the range of i=1 to k; and generate a plurality of data sets each comprising the selected piece of verification data Di at each of the temperatures Ti, the plurality of data sets having different combinations of selection of the pieces of verification data Di;
    a judging unit configured to: calculate a linear approximation function based on each of the plurality of data sets; and judge, using an evaluation index value based on respective differences of the pieces of verification data Di in each of the data sets from the linear approximation function, applicability of each of the data sets; and
    a coefficient-of-thermal-expansion calculator configured to calculate a coefficient of thermal expansion based on each of the plurality of data sets.

2. The coefficient-of-thermal-expansion measuring device according to claim 1, wherein
    the judging unit is configured to exclude any of the data sets that provides the coefficient of thermal expansion out of a predetermined first acceptable range.

3. The coefficient-of-thermal-expansion measuring device according to claim 1, wherein
    the evaluation index value comprises a representative value of the respective differences of the pieces of verification data Di in each of the data sets from the linear approximation function, and
    the judging unit is configured to judge the applicability of a first data set among the data sets that has a smallest evaluation index value.

4. The coefficient-of-thermal-expansion measuring device according to claim 3, wherein
the judging unit is configured to determine whether the smallest evaluation index value of the first data set falls within a predetermined second acceptable range.

5. The coefficient-of-thermal-expansion measuring device according to claim 3, wherein
the judging unit is configured to determine whether a difference between the smallest evaluation index value of the first data set and a second smallest evaluation index value of a second data set among the data sets is at least a predetermined value.

6. The coefficient-of-thermal-expansion measuring device according to claim 1, further comprising an order range acquiring unit configured to acquire the range of the order of interference, wherein
the data set generating unit is configured to generate the verification data Di by setting the order of interference within the range of the order of interference acquired by the order range acquiring unit.

7. The coefficient-of-thermal-expansion measuring device according to claim 1, wherein
the actual data Li comprises actual data Lf at a predetermined temperature Tf, and
the data set generating unit is configured to calculate verification data Df for the actual data Lf by fixing the order of interference of the actual data Lf and to calculate the verification data Di for the rest of the actual data Li by setting the order of interference within the predetermined range.

8. The coefficient-of-thermal-expansion measuring device according to claim 1, wherein
the actual data acquiring unit is configured to acquire the actual data Li resulting from changing temperature variations of the temperature of the object at irregular intervals.

9. A coefficient-of-thermal-expansion measurement method for measuring a coefficient of thermal expansion of an object, the method comprising:
sequentially changing a temperature of the object to temperatures Ti in a range of i=1 to k;
acquiring actual data Li of a length of the object measured at each of the temperatures Ti using an optical interferometer configured to emit a single-wavelength light;
generating a plurality of pieces of verification data Di for the actual data Li at each of the temperatures Ti by setting an order of interference within a predetermined range;
selecting one of the pieces of verification data Di at each of the temperatures Ti in the range of i=1 to k;
generating a plurality of data sets each comprising the selected piece of verification data Di at each of the temperatures Ti, the plurality of data sets having different combinations of selection of the pieces of verification data Di;
calculating a linear approximation function based on each of the plurality of data sets;
judging, using an evaluation index value based on respective differences of the pieces of verification data Di in each of the data sets from the linear approximation function, applicability of each of the data sets; and
calculating the coefficient of thermal expansion based on each of the plurality of data sets.

* * * * *